United States Patent [19]

Lumby et al.

[11] 3,989,782

[45] Nov. 2, 1976

[54] METHOD OF FORMING A SINTERED CERAMIC PRODUCT

[75] Inventors: Roland John Lumby; Bernard North, both of Birmingham, England

[73] Assignee: Joseph Lucas Limited, Birmingham, England

[22] Filed: Dec. 23, 1974

[21] Appl. No.: 535,513

[30] Foreign Application Priority Data
Dec. 29, 1973 United Kingdom............... 60144/73
June 20, 1974 United Kingdom............... 27331/74

[52] U.S. Cl.................................. 264/56; 106/62; 106/65; 106/73.3; 106/73.33; 106/73.4; 106/73.5; 264/65; 423/327

[51] Int. Cl.$^2$.................... C04B 33/32; C04B 35/58

[58] Field of Search.................. 106/62, 58, 59, 60, 106/61, 65, 73.4, 73.5; 423/327, 385; 264/65, 56

[56] References Cited
UNITED STATES PATENTS

| | | | |
|---|---|---|---|
| 3,108,887 | 10/1963 | Lenie et al............................ | 106/62 |
| 3,262,761 | 7/1966 | Bechtold........................... | 106/65 X |
| 3,262,763 | 7/1966 | Bechtold........................... | 29/182.5 |
| 3,409,417 | 11/1968 | Yates................................. | 29/182.5 |
| 3,833,389 | 9/1974 | Komeya et al....................... | 106/65 |
| 3,836,374 | 9/1974 | Richerson et al.................. | 106/73.5 |
| 3,837,871 | 9/1974 | Weaver.............................. | 106/65 |
| 3,903,230 | 9/1975 | Kamigaito et al.............. | 106/73.4 X |
| 3,950,464 | 4/1976 | Masaki et al. ....................... | 106/65 |

FOREIGN PATENTS OR APPLICATIONS

| | | | |
|---|---|---|---|
| 285,005 | 10/1965 | Australia............................. | 264/65 |
| 2,354,024 | 6/1974 | Germany | |
| 40-25062 | 11/1965 | Japan................................... | 106/58 |
| 970,639 | 6/1964 | United Kingdom | |

OTHER PUBLICATIONS

Oyama, Y., "Solid Solution in the Ternary System, $Si_3N_4$–AlN–$Al_2O_3$" Japan, J. Appl. Phys. 11, No. 5 (1972) pp. 760–761.
Masaki, H. et al. "Low Temperature Synthesis of Silicon Nitride–Solid Solution" Japan, J. Appl. Phys. 14, No. 2 pp. 301–302, Feb. 1975.
Jack, K. H. et al. "Ceramics Based on the Si–Al–O–N & Related Systems" Nature — Physical Science 238 pp. 28–29, July 10, 1972.

*Primary Examiner*—Helen M. McCarthy
*Attorney, Agent, or Firm*—Holman & Stern

[57] ABSTRACT

In a method of forming a sintered, ceramic product, aluminium nitride is reacted with silica at a temperature of between 1200° and 2000° C to form a single phase silicon aluminium oxynitride ceramic material, the reaction mixture at said temperature containing not more than 60% by weight of the aluminium nitride and also containing first and second metal oxides other than silica. The metal oxides are arranged so that they do not introduce into the mixture a combination of magnesium oxide and alumina alone and further are arranged so that during the reaction they combine with part of said silica to form a silicate glass having a liquidus temperature below that of the silicate glass which would be formed from silica with either of said metal oxides alone. The silicate glass formed then aids densification of the ceramic material during sintering.

16 Claims, No Drawings

METHOD OF FORMING A SINTERED CERAMIC PRODUCT

This invention relates to a method of forming a sintered, ceramic product.

A related copending application dealing with the same subject matter is Jack et al., U.S. Ser. No. 566,605, filed Apr. 8, 1975 which, in turn, is a Rule 60 of U.S. Ser. No. 322,778, filed Jan. 11, 1973, now abandoned.

A method, according to one aspect of the invention, of forming a sintered ceramic product wherein a mixture consists essentially of an effective amount of aluminum nitride, silica, alumina and silicon nitride is provided and the relative proportions of said aluminum nitride, silica, alumina and silicon nitride are such that there is formed, after surrounding with a protective medium and sintering at a temperature between 1200°–2000° C, a ceramic material consisting of at least 95% by weight of a single phase compound obeying the formula $Si_{6-z}Al_zN_{8-z}O_z$ where $z$ is greater than zero and less than or equal to 5, the improvement being the step of introducing into said mixture at least two metal oxides, each being of a different metal, selected from the group consisting of magnesium oxide, a manganese oxide, lithium oxide, titanium dioxide, a boron oxide, and ferric oxide, wherein said at least two metal oxides react with part of the silica present in said mixture to form a silicate glass having a liquidus temperature below that of the silicate which would be formed from silica and either of the metal oxides alone, said glass aiding densification of the ceramic material.

A method, according to a further aspect of the invention, of forming a sintered ceramic product wherein a mixture consisting essentially of an effective amount of aluminum nitride, silica, and alumina is provided and the relative proportions of said aluminum nitride, silica and alumina are such that there is formed, after surrounding with a protective medium and sintering at a temperature between 1200°–2000° C, a ceramic material consisting of at least 95% by weight of a single phase compound obeying the formula $Si_{6-z}Al_zN_{8-z}O_z$ where $z$ is greater than 4 and less or equal to 5, the improvement being the step of introducing into said mixture at least two metal oxides, each being of a different metal, selected from the group consisting of magnesium oxide, a manganese oxide, lithium oxide, titanium dioxide, a boron oxide, and ferric oxide, wherein said at least two metal oxides react with part of the silica present in the mixture to form a silicate glass having a liquidus below that of a silicate which would be formed from silica with either of the metal oxides alone, said glass aiding densification of the ceramic material.

Conveniently, at least part of the silica in said mixture at said temperature is present as an impurity contained by the silicon nitride. Conveniently, at least part of the alumina in the mixture at said temperature is present as an impurity contained by the aluminium nitride.

Preferably, the liquidus temperature of the silicate formed from silica with the metal oxides together is at least a 100° C below that of the silicate which would be formed from silica with each metal oxide alone.

Preferably, the heating step is accompanied by pressure.

Preferably, where the metal oxides are each pressing aids for said ceramic material, their total quantity in the mixture is less than the quantity which would be required if each metal oxide were present on its own.

Alternatively, the heating step is performed in the absence of pressure.

Conveniently, at least one of the constituents present in said mixture at said temperature is introduced into the starting materials used to produce the mixture as a compound which provides the required constituent or constituents at said temperature.

Conveniently at least one of metal oxides is introduced into said mixture as a metal compound capable of decomposing to the required oxide during the heating step.

Alternatively, prior to reaction to produce the silicate glass, at least one of metal oxides is present in said mixture in combination with a portion of said silica as a metal silicate.

Preferably, the metal oxides are chosen from the group consisting of magnesium oxide, alumina, a manganese oxide, lithium oxide, titanium dioxide, a boron oxide, and ferric oxide.

For the purposes of comparison, a control experiment was first carried out in which silicon nitride, aluminium nitride and silica were mixed in powder form in the proportions required to produce a ceramic material which consisted substantially entirely of a compound obeying the general formula:

where $z$ was equal to 1.

The silicon nitride powder employed consisted of 89% of the α-phase material and had a mean particle size of 3 microns. The aluminium nitride powder was that supplied by Koch-Light as type '8006H' which, as supplied, had a mean particle size of 11.5 microns but before use was reduced in a colloid mill to a mean particle size of 7 microns. Moreover, the silica powder employed was that supplied by Hopkin and Williams Limited as pure, precipitated silica. It was, however, known that the silicon nitride powder inherently contained silica as a coating over the particles of silicon nitride, and further that the aluminum nitride inherently contained an impurity of alumina. As will readily be understood, both of these impurities affected the subsequent reaction to produce the silicon aluminum oxynitride ceramic material since they contributed silicon, aluminium and oxygen to the reaction. Thus, before mixing the starting materials described above, the impurity levels in the silicon nitride and aluminium nitride was determined by fast neutron activation analysis and allowance was then made for these impurities in arriving at the required composition for the mixture. Using the particular starting materials described above, it was found that the silica content of the silicon nitride powder was 4% by weight and the alumina content of the aluminium nitride was 6% by weight.

From these results it was calculated that, in order to obtain the required ceramic material the necessary composition for the starting mixture was 78.48% by weight of the silicon nitride powder, 14.76% by weight of the aluminium nitride powder and 6.76% by weight of the silica powder since, allowing for the impurities in the silicon nitride and aluminium nitride, this mixture provided silicon, aluminium, nitrogen and oxygen in the required proportions of:

6-z:z:8-z:z respectively where z was equal to 1.

To the above mixture was added a first metal oxide in the form of magnesium oxide powder, which is of course a well known hot pressing aid for silicon nitride - type ceramic materials. The magnesium oxide powder was that supplied by Hopkin and Williams Limited under the term "light" and the amount of magnesium oxide added was such that it constituted 1% by weight of the total mixture. Thus, the overall composition of the starting mixture was 74.6% by weight silicon nitride, 13.72% by weight aluminium nitride, 9.8% by weight silica, 0.88% by weight alumina and 1% by weight magnesium oxide.

After introduction of the magnesium oxide powder, the starting mixture was introduced into a colloid mill and was mixed in iso-propyl alcohol until the mean particle size of the mixture was 3 microns. Thereafter, the mixture was dried, and then was sieved to remove any powder agglomerates. An impurity determination was then carried out on the mixture which showed that the milling, drying and sieving operations had not altered the impurity levels of the starting materials. Subsequently, the mixture was loaded into the die cavity of a graphite die onto a graphite plug closing an open end of the die cavity. A graphite punch was then assembled onto the powder charge, all graphite surfaces in contact with the powder having previously been spray-coated with boron nitride to a depth of the order of 0.01 inch. The assembly was then introduced into a press, where the temperature and pressure were simultaneously increased, over a period of 30 minutes, to 1800° C and 1.5 tons/sq.in. respectively. The mixture was then maintained at this temperature and pressure for one hour, and under these conditions consisted entirely of magnesium oxide together with a reactable composition in which the atomic ratio of silicon: aluminium: nitrogen: oxygen were in the proportions given above which were of course the proportions required in the ceramic material to be produced. Thus, the components of the reactable composition reacted together to produce the required ceramic material, the hot pressing of which was aided by the magnesium oxide additive. On cooling, the hot pressed product was removed from the die and was subjected to X-ray analysis which showed that the ceramic phase of the product consisted entirely of a compound having a Z value of 1 in the above formula. Also, the product was found to have a density of 3.16 gm/c.c. it having been noted that during hot pressing the mixture had attained 90% of this final density when the temperature reached approximately 1650° C. Further, the final product was found to have a modulus of rupture value at room temperature of 60,000 p.s.i. and a Weibull modulus of 8.0.

In a first example according to the invention the starting mixture of the control experiment was again employed, except that in this example the magnesium oxide content was reduced from 1% to 0.5% by weight and in addition a second metal oxide, in the form of 0.5% by weight of manganese oxide ($Mn_3O_4$), was introduced into the mixture. The manganese oxide employed was supplied by Hopkin and Williams Limited and, in this example the procedure of the control experiment was again followed. On removal from the die, the final product was found to have a mean modulus of rupture value at room temperature of 82,000 p.s.i., a Weibull modulus of 10 and a density of 3.23 gm/c.c. Moreover, by following the movement of the graphite punch during the hot pressing process, it was noted that the sample had attained 90% of its final density when the temperature had reached approximately 1450° C, which was of course at a lower temperature than in the control experiment.

In the method of the first example, the manganese oxide and magnesium oxide reacted together with some of the silica present in the starting mixture to produce a magnesium manganese silicate glass whose liquidus temperature was below that of the silicate formed when magnesium oxide alone was employed. Thus, during hot pressing the magnesium manganese silicate provided a less viscous liquid glass than that provided by the magnesium silicate of the control experiment at the same temperature. Hence the magnesium manganese silicate glass provided for easier densification of the material being hot pressed and thereby resulted in a final product of improved consistency, strength and density.

In a second example of the invention, the procedure of the first example was repeated, but in this case the magnesium oxide and manganese oxide content of the starting mixture were each increased to 1% by weight of the total mixture, while the silicon nitride content was decreased by 1% by weight. Thus, taking into account the impurities on the silicon and aluminium nitrides, the starting mixture consisted of 73.6% by weight of silicon nitride, 13.72% by weight of aluminium nitride, 9.8% by weight of silica, 0.88% by weight of alumina, 1% by weight of magnesium oxide and 1% by weight of manganese oxide. The final product had a mean modulus of rupture at room temperature of 95,000 p.s.i., a Weibull modulus of 8.4 and a final density of 3.24. Again it was noted that during hot pressing the material attained 90% of its final density at a temperature of approximately 1450° C.

In a third example of the invention, the procedure of the first example was again repeated, but in this case the manganese oxide content was increased to 1% by weight of the total mixture without any increase in the magnesium oxide content. Moreover, the silicon nitride content was reduced by 0.5% by weight to cater for the increase in the magnesium oxide content, whereby the overall composition of the starting mixture was now 74.1% by weight silicon nitride, 13.72% by weight of aluminium nitride, 9.8% by weight of silica, 0.88% by weight of alumina, 0.5% by weight of magnesium oxide and 1% by weight of manganese oxide. The final product had a mean modulus of rupture value at room temperature of 100,000 p.s.i., a Weibull modulus of 9.0 and a density of 3.20 gm/c.c. Once again, it was noted that during hot pressing the material attained 90% of its final density at a temperature of about 1450° C.

In a fourth example of the invention, the magnesium oxide of the third example was reduced by 0.25% by weight and the silicon nitride content increased by a similar amount. The procedure of the control experiment was again followed and resulted in a final product having a mean modulus of rupture value at room temperature of 105,000 p.s.i., a Weibull modulus of 12 and a density of 3.21 gm/c.c. Again it was found that during hot pressing the material attained 90% of its final density at approximately 1450° C.

It is believed that improved results were obtain in the method of the fourth example because the relative proportions of the magnesium oxide and the manganese oxide were such as to produce a magnesium manganese silicate with a very low liquidus temperature, possibly of the order of 1200° C. It is also believed that some magnesium and/or manganese may have entered the silicon aluminium oxynitride lattice.

In a fifth example of the invention, the procedure of the first example was again repeated, but in this case the magnesium oxide content was reduced to 0.05% by weight and the manganese oxide content was reduced to 0.2% by weight, the silicon nitride content being increased in proportion to the decrease in the amounts of the oxide additives. Thus, the overall composition of the starting mixture of the fifth example was 75.6% by weight of silicon nitride, 13.72% by weight of aluminium nitride, 9.8% by weight of silica, 0.88% by weight of alumina, 0.05% by weight of magnesium oxide and 0.2% by weight of manganese oxide. The final product obtained from this mixture had a mean modulus of rupture value at room temperature of 55,000 p.s.i., a Weibull modulus of 7.0 and a density of 2.78. Moreover, during hot pressing, it was noted that the material attained 90% of its final density at a temperature of approximately 1500° C. Further, when the product was subjected to a creep test at 1225° C and at an applied load of 5 t.s.i., it was found to undergo 0.103% creep in 100 hours.

In a sixth example of the invention, the mixture which was hot pressed again contained the first and second metal oxides used in the first example and in the same amounts by weight. However, in this example, different batches of the silicon nitride and aluminium nitride powders were employed and the relative proportions of the starting materials were altered. Thus, the mixture now consisted of 83% by weight silicon nitride, 10% by weight aluminium nitride, 6% by weight silica and 0.5% by weight each of the magnesium and manganese oxides. The mixing and hot pressing procedures of the control experiment were again followed and, on removal from the die, the final product was found to have a mean modulus of rupture value at room temperature of 102,000 p.s.i., a Weibull modulus of 10 and a density of 3.23 gm/c.c. Moreover, during the hot pressing process, it was noted that the sample attained 90% of its final density when the temperature reached approximately 1450° C.

In the case of the starting mixture of the sixth example, analysis showed that the silica content of the silicon nitride powder was 2.6% by weight and that the alumina content of the aluminium nitride powder was 4.25% by weight. Using these figures, it can readily be calculated that at the hot pressing temperature this starting mixture produced a reactable composition which consisted of silicon, aluminium, nitrogen and oxygen in the atomic ratio of $6-z:z:8-z:z$ respectively where z was of the order of 0.8, but which constituted only about 90% by volume of the overall mixture. As expected, therefore, the sintered product of the sixth example contained about 5% by weight of a glassy phase in addition to a silicon aluminium oxynitride ceramic material obeying the formula $Si_{5.2}Al_{0.8}N_{7.2}O_{0.8}$, some weight losses also being observed.

In a modification of the sixth example, the same procedure was repeated with three separate starting mixtures containing different amounts of the magnesium and manganese oxide powders, the silicon nitride content of the mixtures being adjusted, where necessary, to cater for the variations in the amounts of metal oxides present. The results of this modification are shown in the following table:

| % by weight composition of starting mixture. | | | | | Properties of hot pressed product. | | |
|---|---|---|---|---|---|---|---|
| $Si_3N_4$ | AlN | $SiO_2$ | MgO | $Mn_3O_4$ | Mean modulus of rupture. | Weibull Modulus | Density |
| 82 | 10 | 6 | 1 | 1 | 110,000p.s.i. | 8.4 | 3.24 |
| 82.5 | 10 | 6 | 0.5 | 1 | 110,000p.s.i. | 7.2 | 3.20 |
| 82.75 | 10 | 6 | 0.25 | 1 | 114,000p.s.i. | 20.8 | 3.21 |

From the above table it will be seen that, as in the fourth example, the best results were obtained when the mixture contained 0.25% by weight of magnesium oxide and 1% by weight of manganese oxide.

In a seventh example of the invention the starting materials of the control experiment were again employed, but lithium oxide was used as the second metal oxide in place of the manganese oxide used in the previous examples. The lithium oxide was introduced into the starting mixture as lithium silicate which was supplied by Koch-Light Laboratories Limited as lithium silicate 99.5% 325 mesh. Processing continued as in the previous examples and the relative proportions of the starting materials were such that at the hot pressing temperature the overall composition of the mixture was 75.6% by weight silicon nitride, 13.72% by weight aluminium nitride, 0.88% by weight alumina, 0.125% by weight magnesium oxide, 0.125% by weight lithium oxide and 9.8% by weight of silica, part of the latter of course being contributed by the lithium silicate as well as by the silicon nitride. The relative proportions of lithium oxide and magnesium oxide in this mixture were chosen from the lithium oxide/magnesium oxide/silica ternary diagram which showed that when silica was reacted with these proportions of lithium oxide and magnesium oxide, there was produced a silicate having a lower liquidus temperature than the magnesium silicate of the control experiment. Subsequent treatment of the mixture followed the procedure of the control experiment and the resultant product was found to have a density of 3.21 gm/c.c., a mean modulus of rupture value at room temperature of 80,000 p.s.i., and a Weibull modulus of 12.

In a modification of the seventh example, the same procedure was repeated, but in this case the overall composition of the starting mixture was 75.1% by weight silicon nitride, 13.72% by weight aluminium nitride, 9.8% by weight silica, 0.88% by weight alumina, 0.25% by weight magnesium oxide and 0.25% by weight lithium oxide. The final product was found to have a density of 3.17, a mean modulus of rupture value at room temperature of 100,400 p.s.i., and a Weibull modulus of 14.6. Moreover, it was found that during hot pressing the product attained 90% of its final density at a temperature of about 1350° C.

In a further modification of the seventh example, the lithium silicate employed previously was added to the starting materials of the sixth example in place of the manganese oxide so that the overall composition of the mixture was 83.5% by weight silicon nitride, 10% by weight aluminium nitride, 0.125% by weight magnesium oxide, 0.125% by weight lithium oxide and 6% by weight of silica, part of the latter of course being contributed by the lithium silicate. Subsequent treatment of the mixture followed the procedure of the control experiment and the resultant product was found to have a density of 3.21 gm/c.c., a mean modulus of rupture value at room temperature of 99,000 p.s.i., and a Weibull modulus of 13.

In an eighth example according to the invention, the starting mixture of the control experiment was again employed, except that in this example the magnesium oxide content was reduced from 1% to 0.5% by weight and in addition 0.5% by weight of titanium dioxide was introduced into the mixture. The procedure of the control experiment was then followed, and on removal from the die, the final product was found to have a mean modulus of rupture value at room temperature of 90,000 p.s.i., a Weibull modulus of 12.6 and a density of 3.19 gm/c.c. In addition, by following the movement of the graphite punch during the hot pressing process it was noted that the sample had attained 90% of its final density when the temperature had reached approximately 1350° C, which was of course at a lower temperature than in the control experiment. Further, when the product was subjected to a creep test at 1225° C and an applied load of 5 t.s.i., it was found that the product underwent 0.10% creep in 20 hours.

In the same way as the metal oxides employed in the method of the first example, the magnesium oxide and the titanium dioxide of the seventh example reacted with some of the silica present in the starting mixture to produce a magnesium titanium silicate glass whose liquidus temperature was below that of the silicate formed when magnesium oxide alone was employed in the control experiment. Thus, during hot pressing, the magnesium titanium silicate provided a less viscous liquid than that provided by the magnesium silicate of the control experiment at the same temperature. Hence the magnesium titanium silicate allowed easier densification of the material being hot pressed and thereby resulted in a final product of improved consistency, strength and density.

In a ninth example of the invention, the procedure of the previous example was repeated, but in this case the amounts of magnesium oxide and titanium dioxide in the starting material were each increased to 1% by weight of the total mixture, while the silicon nitride content was decreased by 1% by weight. Thus, the starting mixture consisted of 73.6% by weight of silicon nitride, 13.72% by weight of aluminium nitride, 9.8% by weight of silica, 0.88% of alumina, 1% by weight of magnesium oxide and 1% by weight of titanium dioxide. The final product had a mean modulus of rupture value at room temperature of 75,000 p.s.i., a Weibull modulus of 8 and a final density of 3.18. Moreover, it was noted that during hot pressing the material attained 90% of its final density at a temperature of approximately 1550° C.

Although in each of the above examples only two metal oxides were added to the starting material for producing the required silicon aluminium oxynitride, it is to be appreciated that more than two metal oxides could have been employed. Thus, in a tenth example of the invention, the procedure of the previous examples was repeated with a starting mixture consisting of 10% by weight aluminium nitride, 6% by weight silica, 83.7% silicon nitride, 0.1% magnesium oxide, 0.1% lithium oxide, and 0.1% boric oxide ($B_2O_3$). In this mixture, the magnesium oxide and lithium oxide defined first and second metal oxides respectively and, as in the seventh example, were introduced in equal weight proportions since they then reacted with part of the silica present to produce a low melting point glass. The effect of adding the third metal oxide, that is the boric oxide, was to then reduce the melting point of the glass. The boric oxide employed in this example was produced by calcining orthoboric acid at 800° C, the resultant oxide then being crushed and mixed with the other starting materials in a colloid mill. Using this mixture, it was found that the ceramic phase of the hot pressed product consisted substantially entirely of a compound having a z value of the order of 0.8 in the above formula. Also, the product was found to have a mean modulus of rupture value at room temperature of 90,000 p.s.i., and a Weibull modulus of 10. Moreover, when the sintered product was subjected to a creep test at 1227° C and at an applied load of 5 t.s.i., it was found to undergo 0.05% creep in 100 hours.

In a modification of the tenth example, the procedure was repeated but with 0.1% by weight of a fourth metal oxide in the form of alumina being added to the starting mixture, the silicon nitride content of the mixture having been reduced by 0.1% by weight to cater for the alumina addition. It was found that the addition of the alumina further aided densification of the ceramic material during sintering.

In an eleventh example, three metal oxides were again introduced into the starting mixture, which in this case consisted of 11% by weight aluminium nitride, 6% by weight silica, 80.75% by weight silicon nitride, 0.25% by weight magnesium oxide, 1% by weight manganese oxide ($Mn_3O_4$) and 1% by weight ferric oxide. The hot pressing procedure of the control experiment was again repeated and, as in the previous example, the ceramic phase of the resultant product consisted substantially entirely of a compound having a z value of about 0.8 in the above formula. Moreover, the product was found to have a mean modulus of rupture value at room temperature of 105,000 p.s.i., and a Weibull modulus of 20.

It is to be appreciated that each of the above examples could have been performed without pressure being applied during the sintering operation. Thus in a twelfth example of the invention, a sample of the starting mixture from the previous example was introduced into a rubber bag and was isostatically pressed at room temperature and a pressure of 20,000 t.s.i, using a hydraulic surround to produce a preform having a density of 1.5 gm/c.c. The preform was then coated with a mixture consisting of equal parts by weight of boron nitride and silica and was buried in a boron nitride powder bed contained within a graphite pot. The assembly was then heated for 1 hour at 1700° C, whereafter the temperature was raised to 1800° C and maintained at this value for a further hour. The sintered product had a mean modulus of rupture value at room temperature of 45,000 p.s.i., a Weibull modulus of 12 and a density of 2.55 gm/c.c.

In each of the above examples, the ceramic phase of the sintered product has consisted entirely or predominantly of a compound obeying the above formula and having a z value equal to or less than 1. It is, however, to be appreciated that the method described can be used to produce ceramic materials having z values up to 5 in the above formula. Thus in a thirteenth example a ceramic material having a z value equal to 4 in the above formula was produced by sintering a starting mixture which consisted of 38% by weight aluminium nitride, 22.5% by weight silica, 22.5% by weight alumina, 16% by weight silicon nitride and 1% by weight lithium oxide. In this mixture, part of the alumina defined one of the glass-forming metal oxides, whereas the remainder reacted at the elevated temperature of the sintering process to produce the required ceramic material. Moreover, the lithium oxide was added to the starting materials in the form of lithium silicate, as in the seventh example, so that part of the silica in the starting mixture was contributed by the lithium silicate. When the starting mixture was hot pressed according to the procedure of the control experiment, the resultant sintered product had a mean modulus of rupture value at room temperature of 45,000 p.s.i. whereas when the mixture was sintered without the application of pressure according to the technique of the twelfth example the sintered product had a mean modulus of rupture value at room temperature of 35,000 p.s.i., and a Weibull modulus of 8.

Although in the above examples, the mixtures heated to produce the required ceramic product have contained silicon nitride, the method described can also be performed with mixtures consisting solely of silica, alumina, aluminium nitride and two or more metal oxides. However, where silicon nitride is absent from the starting mixture, it is found that in the reactable composition produced on heating the mixture although the atomic ratio of silicon: aluminium: silicon: oxygen can be equal $6-z:z:8-z:z$ respectively, the z value is always in excess of 4. Thus the ceramic material obtained from such a material always exhibits a z value greater than 4 in the above formula.

It is to be appreciated that in the examples described one or more of the metal oxides can be introduced into the starting mixtures as metal compounds capable of decomposing to the required oxides on subsequent heating. Thus, as in the seventh example the metal oxides could be introduced in combination with part of the silica as metal silicates. Also the alumina required in the mixture at the hot pressing temperature could be introduced into starting materials as aluminium hydroxide, whereas the silica could be introduced as ethyl silicate. Similarly, silicon oxynitride (to provide silica and silicon nitride at the hot pressing temperature) and aluminium oxynitride (to provide aluminium nitride and silica at the hot pressing temperature) could be used as starting materials.

In performing the method described above, it is preferable that at least one of the metal oxides which react to produce the low melting point silicate glass is capable of entering the crystal lattice of the silicon aluminium oxynitride ceramic material produced. In this way, the glass not only melts during the heating step so as to aid densification of the starting materials and hence aid production of the required densified ceramic product but also when the temperature rises to the value required for the production of the ceramic material the composition of the glass changes by virtue of some of at least one of said metal oxides entering the ceramic lattice. It is believed this change in the glass composition is accompanied by an increase in melting point of the glass so that the high temperature properties of the densified ceramic product are enhanced. In this respect, it is to be appreciated that all of the metal oxides disclosed above are capable of entering the lattice of the ceramic materials produced.

In each of the starting mixtures of the above examples the total amount of the metal oxides which react to produce the low melting point silicate glass has been of the order of 2% by weight of the mixture and below. It is, however, to be appreciated that larger quantities of the metal oxides can be usefully employed especially where sintering is effected without pressure being applied to aid densification. In this respect the metal oxide content is normally arranged so that, allowing for weight losses during sintering, the amount of silicate glass in the sintered product does not exceed 5% by weight of the product. This is not, however, an absolute limit since higher glass contents may be tolerable, especially when the product is to be used at low temperatures and in situations where its creep strength is not important (i.e. a corrosion resistant material).

In performing the methods described above, it is of course possible that one or more of the starting materials may contain as impurities metal oxides capable of reacting with silica to produce a low melting point silicate glass. It is therefore necessary to allow for such impurities in calculating the amounts of metal oxide to be added to the starting materials.

Further it is to be understood that in performing the method of the invention, sintering of the starting materials should be effected at or above 1200° C since below this temperature there is little or no reaction to produce the required ceramic material. The sintering temperature should not, however, exceed 2000° C since above this temperature at least some of the species present show a marked tendency to dissociate. The optimum temperature is therefore between 1500° C and 1800° C since this gives a reasonable reaction rate without leading to large weight losses. It is, however, to be understood that even when the sintering temperature is within the optimum range, some weight losses are inevitable for example of the lithium oxide in the seventh, tenth and thirteenth examples and these should be catered for in calculating the composition of the starting material.

We claim:

1. In a method of forming a sintered ceramic product wherein a mixture consisting essentially of an effective amount of aluminum nitride, silica, alumina and silicon nitride is provided and the relative proportions of said aluminum nitride, silica, alumina and silicon nitride are such that there is formed, after surrounding with a protective medium and sintering at a temperature between 1200°–2000° C, a ceramic material consisting of at least 95% by weight of a single phase compound obeying the formula $$Si_{6-z}Al_zN_{8-z}O_z$$

where z is greater than zero and less than or equal to 5, the improvement being the step of introducing into said mixture at least two metal oxides, each being of a different metal, selected from the group consisting of magnesium oxide, a manganese oxide, lithium oxide, titanium dioxide, a boron oxide, and ferric oxide, wherein said at least two metal oxides react with part of the silica present in said mixture to form a silicate glass having a liquidus temperature below that of the silicate which would be formed from silica and either of the metal oxides alone, said glass aiding densification of the ceramic material.

2. In a method of forming a sintered ceramic product wherein a mixture consisting essentially of an effective amount of aluminum nitride, silica, and alumina is provided and the relative proportions of said aluminum nitride, silica and alumina are such that there is formed, after surrounding with a protective medium and sintering at a temperature between 1200°–2000° C, a ceramic material consisting of at least 95% by weight of a single phase compound obeying the formula:

$$Si_{6-z}Al_zN_{8-z}O_z$$

where z is greater than 4 and less than or equal to 5, the improvement being the step of introducing into said mixture at least two metal oxides, each being of a different metal, selected from the group consisting of magnesium oxide, a manganese oxide, lithium oxide, titanium dioxide, a boron oxide, and ferric oxide, wherein said at least two metal oxides react with part of the silica present in the mixture to form a silicate glass having a liquidus below that of a silicate which would be formed from silica with either of the metal oxides alone, said glass aiding densification of the ceramic material.

3. The method as claimed in claim 1, wherein at least part of the silica in said mixture is introduced as an impurity contained by the silicon nitride.

4. The method as claimed in claim 1 wherein, at least part of the alumina in the mixture is introduced as an impurity contained by the aluminum nitride.

5. The method as claimed in claim 1 wherein the liquidus temperature of the silicate formed from silica with the metal oxides together is at least a 100° C below that of the silicate which would be formed from silica with each metal oxide alone.

6. The method as claimed in claim 1, wherein the heating step is accompanied by pressure.

7. The method as claimed in claim 6, wherein the metal oxides are each pressing aids for said ceramic material and their total quantity in the mixture is less than the quantity which would be required if each metal oxide were present on its own.

8. The method as claimed in claim 1, wherein at least one of the constituents present in said mixture is introduced into the starting materials used to produce the mixture as a compound which provides the required constituent or constituents at said temperature.

9. The method as claimed in claim 1, wherein prior to reaction to produce the silicate glass, at least one of the metal oxides is present in said mixture in combination with a portion of said silica as a metal silicate.

10. The method as claimed in claim 1, wherein said at least two metal oxides are magnesium oxide and trimanganese tetroxide.

11. The method as claimed in claim 10, wherein said magnesium oxide and trimanganese tetroxide are present in said mixture in a weight ratio of the order of 1:4 respectively.

12. The method as claimed in claim 10, wherein said at least two metal oxides also includes ferric oxide.

13. The method as claimed in claim 1, wherein said at least two metal oxides are magnesium oxide and lithium oxide present in said mixture in substantially equal weight proportions.

14. The method as claimed in claim 13, wherein said at least two metal oxides also include an oxide or boron.

15. The method as claimed in claim 1, wherein said at least two metal oxides are magnesium oxide and titanium dioxide and are present in said mixture in substantially equal weight proportions.

16. The method as claimed in claim 1, wherein the amount of said at least two metal oxides present in said mixture at said temperature is such that said silicate glass constitutes up to 5% by weight of the sintered product.

* * * * *